Aug. 11, 1942.   W. F. TRIPPENSEE   2,292,726
CLOSURE MEANS FOR BOTTLES OR JARS
Filed Oct. 9, 1939
FIG.I.
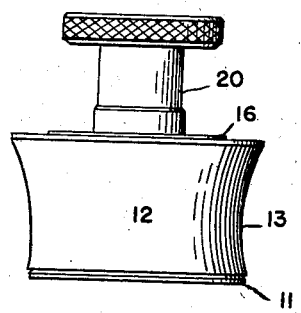
FIG.2.
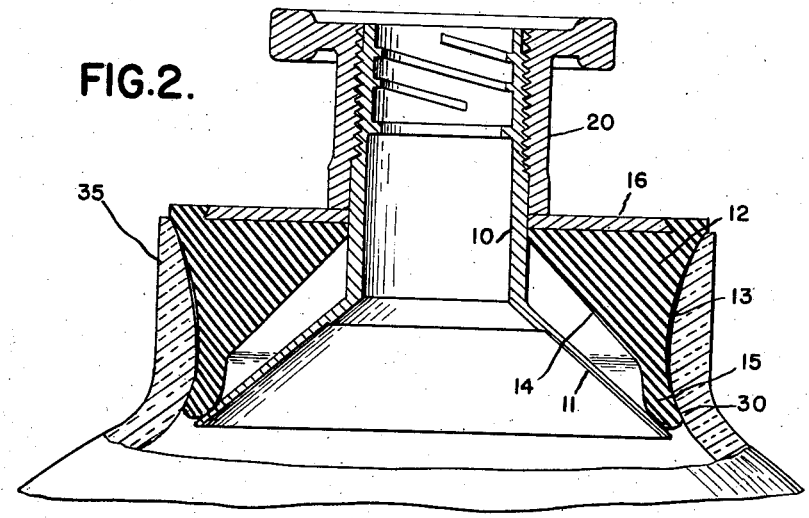
FIG.3.
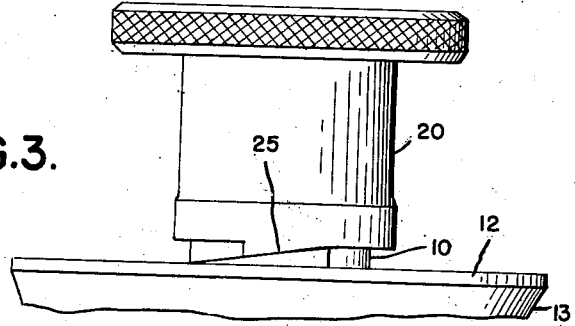
INVENTOR.
WILLIAM F. TRIPPENSEE
BY
ATTORNEYS Patented Aug. 11, 1942

2,292,726

UNITED STATES PATENT OFFICE 2,292,726

CLOSURE MEANS FOR BOTTLES OR JARS

William F. Trippensee, Detroit, Mich.

Application October 9, 1939, Serial No. 298,572

2 Claims. (Cl. 215—73)

The present invention relates to means designed chiefly for closing bottles or jars, but it is not to be considered as limited to such uses since with minor modification it may be used for closure of many other kinds of openings, such as openings in barrels or tanks or for closing portholes in boats without the use of studs and thumbnuts.

Among the objects of the invention is a self-contained unit which may be put in place quickly and easily and which furnishes a complete seal against pressure from either side.

Another object is a unit of the kind indicated which will make a complete seal regardless of the usual irregularities of a supposedly circular opening.

Another object is a unit of the kind indicated which may be used for a seal or may itself be provided with an opening for the reception of conduit connections, thereby enabling the transfer to or from a container of fluid material using either suction or pressure.

Still other objects will readily occur to those skilled in the art upon reference to the following description and the accompanying drawing, in which Figure 1 is an elevational view of the jar closure unit.

Figure 2 is a vertical central section therethrough, showing it in place in a wide mouth bottle or jar; and Figure 3 is a part elevational view of a modification.

As indicated in the drawing, the closure unit comprises a central tube 10 having secured to one end a widely flared funnel-shaped or conical element 11 opening downwardly. This tube 10 is surrounded by a rubber element 12 generally triangular in section with its outer peripheral surface somewhat concave, as at 13, and tapered from top to bottom.

The inner peripheral surface 14 is at a large angle to the vertical as shown and the lower edge at the apex of the triangle is extended to form a relatively long thin lip 15.

The upper surface of the member 12 is arranged horizontally and provided with a shallow recess having an undercut side wall for the reception of a correspondingly shaped disc 16 of a suitable non-metallic material such as Bakelite, Micarta, or the like. The openings in disc 16 and member 12 should be just sufficiently large to pass loosely over the tube 10.

Threaded upon the upper end of tube 10, is a thumb nut 20 so arranged as to pull the tube 10 and funnel 11 up into member 12 when the nut is screwed down.

Instead of threading the nut 20 upon the tube, other means such as the cam arrangement shown at 25 in Figure 3 may be used for the same purpose.

In constructing the present device it is preferred to make the funnel member 11 of material of sufficient flexibility to allow of some distortion when drawn forcibly upward against member 12. This is to provide for use in a jar in which the opening is not exactly circular, as is often the case with glass and earthenware jars or bottles.

And, it should be noted that the angle to the vertical of the funnel is somewhat greater than the angle of the inner surface 14 of member 12. This arrangement results in the functioning of lip 15 as a true gasket seal between the funnel 11 and the wall 30 of the jar.

In the use of the device, the nut 20, being loosened, allows the lip 15 to contract so that the unit may be thrust into the neck 35 of a suitable jar. The tightening of the nut 20 then draws the funnel 11 up into member 12, expanding the lip 15 against the wall 30 and producing the seal at this point, and, since the vertical dimension of the element 12 is such that the lip 15 lies below the shoulder of the bottle neck, tightening of the nut 20 also draws the tapered rubber element down into the neck. There is thus provided an interior gasket for the bottle as well as a sealing stopper.

If it is desired to establish a sealing shut of the vessel, a suitable plug may be fixed in tube 10, or, obviously, the element 10 may be solid.

Now, having described the preferred form of embodiment of the invention, what is claimed is:

1. A jar closure consisting of an annulus of rubber the cross section of which shows a generally triangular form with an upper horizontal surface and of which the lower edge terminates in an extended lip, an axially located member extending up through said annulus and terminating at its lower end in a thin flexible flared funnel-shaped portion, which, in inactive condition, has its edge adjacent and below said lip and is of substantially the same diameter as said lip, and means coacting with the upwardly extended portion of the axial member for moving the funnel-shaped portion upwardly with respect to said annulus.

2. In combination with a jar having a neck and a shoulder at the lower end of said neck, a closure including an annulus of rubber the cross section of which is generally triangular with a relatively thick lip at the lower edge and flexible means for pressing the lip against the inner surface of said shoulder below said neck.

WILLIAM F. TRIPPENSEE.